United States Patent [19]

Fujimoto

[11] Patent Number: 4,646,465

[45] Date of Patent: Mar. 3, 1987

[54] METHOD OF INOCULATING MUSHROOM BASIDIOSPORES SEED BASIDIOSPORE BED FOR INOCULATION, CULTURE CONTAINER FOR SEED BASIDIOSPORE BED, AND BORING APPARATUS FOR HOST WOOD FOR INOCULATION

[75] Inventor: Tahei Fujimoto, Miyakemachi, Japan

[73] Assignee: Suiseki Fujimoto, Nara, Japan

[21] Appl. No.: 617,562

[22] Filed: Jun. 5, 1984

[51] Int. Cl.⁴ .......................... A01G 1/04; B27C 5/00
[52] U.S. Cl. .................................... 47/1.1; 144/136 R
[58] Field of Search ............................................ 47/1.1

[56] References Cited

U.S. PATENT DOCUMENTS 4,291,492 9/1981 Reynolds.

FOREIGN PATENT DOCUMENTS

| 117557 | 3/1977 | Japan | 47/1.1 |
| 35050 | 8/1977 | Japan | 47/1.1 |
| 16615 | 7/1981 | Japan | 47/1.1 |
| 1271923 | 4/1972 | United Kingdom . | |
| 1522278 | 8/1978 | United Kingdom . | |

OTHER PUBLICATIONS

The Biology & Cultivation of Edible Mushrooms, Chang et al, 1978, Academic Press, p. 464.
Cultivation of the Shiitake Mushroom, San Antonio, Journ. Amer. Soc. Hort. Sci., vol. 16(2), Apr. 1981, pp. 151-156, Sei Library.
World Grand Encyclopedia, vol. 9, pp. 778-779, Edited and Published by Kunihiko Shimonaka, Heibonsha Publishing Co., Tokyo, Japan, (1967), and English abstract.

Primary Examiner—Robert E. Bagwill
Attorney, Agent, or Firm—Wenderoth, Lind & Ponack

[57] ABSTRACT

A method of inoculating basidospores of mushroom (Lentinus edodes) by forming a transverse recess in a host wood and inserting therein a flat, half-moon shaped seed basidospore bed in a manner to fill the recess.

A seed basidospore bed for inoculation is made by incubation of the seed basidospore on a flat, half-moon shaped wooden medium to conform to the shape of the host wood.

The culture container comprises a capped half-split screwed bottle-like body suitable for incubation of seed basidospores and storage.

A boring apparatus for the host wood for inoculation is designed to give many transverse cuts to the host wood efficiently by the use of plural circular saws applicable from various positions.

13 Claims, 12 Drawing Figures

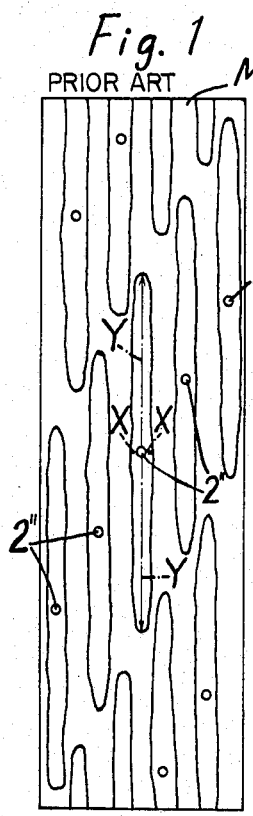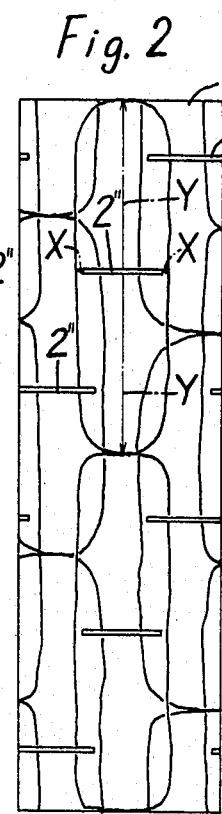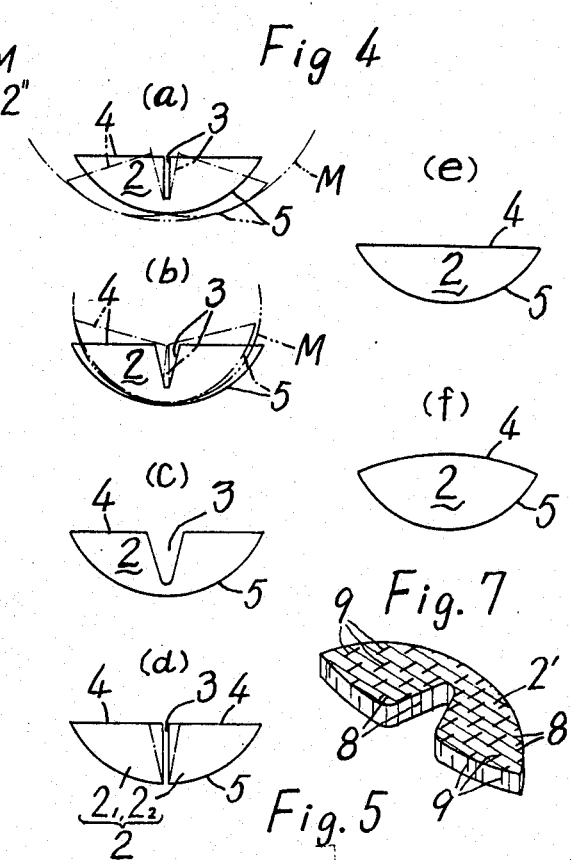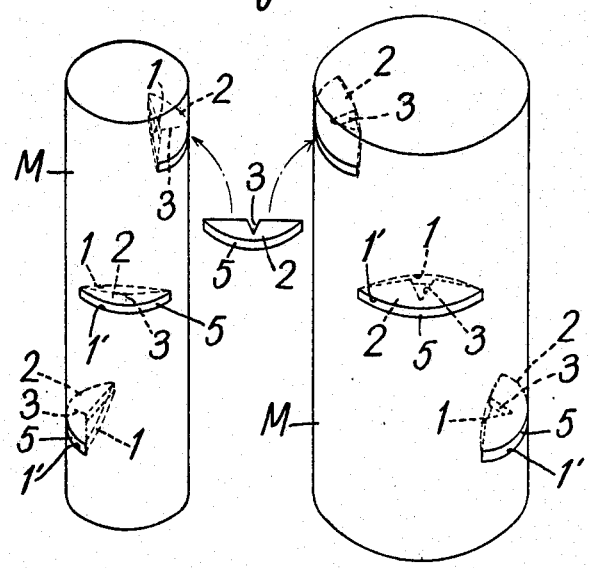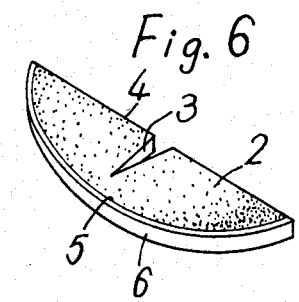

METHOD OF INOCULATING MUSHROOM BASIDIOSPORES SEED BASIDIOSPORE BED FOR INOCULATION, CULTURE CONTAINER FOR SEED BASIDIOSPORE BED, AND BORING APPARATUS FOR HOST WOOD FOR INOCULATION

The present invention relates to a method of inoculating mushroom basidiospores, a seed basidioscpore bed for inoculation, a culture container for the seed basidiospore bed, and a boring apparatus for host wood for inoculation.

In order to artificially cultivate mushrooms especially *Lentinus edodes*, for edible use, a trunk of a certain broad-leaved tree (e.g., oak, maple, birch, etc.) is cut into a suitable length to make a host wood for inoculation of basidiospores. The outer circumferential surfaces of the host wood are bored to make inoculation recesses, into which seed basidiospore beds obtained by pure culture of the seed basidiospores inoculated on wood pieces are set, and cultivation is performed.

Conventional methods for inoculating mushroom basidiospores include a method of inserting a wedge-form seed basidiospore bed into a planting space provided by cutting a host wood with a chisel, and a method of stuffing a sawdust culture of basidiospore or a rod form seed basidiospore bed into the round hole on a host wood provided by an electric drill. These methods have generally been in practice.

The defects of the above conventional methods have been that, in providing a number of planting holes on a host wood to obtain higher planting density so as to rapidly allow the spawn after inoculation to spread into the host wood, a large amount of time and labor for inoculating the seed basidiospores on each planting hole was required.

The present inventors took special notice of the fact that the hypha, after inoculation on the host wood for cultivation of mushroom, would be multiplied at the rate of several scores of times faster in the lengthwise direction of wood than in the widthwise direction of wood.

It is an object of the present invention to provide a new seed basidiospore inoculation method by which, by providing a saw cutout to the host wood for inoculation from its surface to a suitable depth in a transverse direction of said wood to form a cutout recess along the outer circumferential surface of the host wood, and by fitting a flat half-moon shaped seed basidiospore bed in a manner to block said inoculation recess, it is possible to allow the spawn to develop quickly from the inoculated seed basidiospore bed and rapidly spread into the host wood over a broad range, thus making it possible to make the density of inoculation sparse to elevate the efficiency of inoculation work, and to accelerate the crop time and increase the yield with suppression of propagation of miscellaneous bacteria.

Another object of the present invention is to provide a seed basidiospore bed for inoculation suitable for this new inoculation method and a culture container for the seed basidiospore bed suitable for culture and inoculation of this seed basidiospore bed.

A further object of the present invention is to provide a boring apparatus for the host wood for inoculation by mechanization of the inoculation slot to be provided on the host wood for inoculation so as to make it possible to carry out boring work in a short time.

Referring to the drawings,

FIG. 1 is an illustrative view showing the condition of multiplication and propagation of mushroom spawn in the host wood according to the conventional method;

FIG. 2 is an illustrative view showing the condition of multiplication and propagation of spawn in the host wood;

FIG. 3 is a perspective view showing the condition of inoculation of the seed basidiospore bed according to the present invention;

FIG. 4 is a plan view showing various forms of the seed basidiospore bed to be used in the present invention;

FIG. 5 is a side view of the seed basidiospore bed to be used in the present invention;

FIG. 6 is a perspective view of the seed basidiospore bed to be used for the present invention partly provided with a coated layer;

FIG. 7 is a perspective view of the wood piece to form a medium for the seed basidiospore bed to be used for the present invention provided with a number of artificial fissures;

Figure 8:
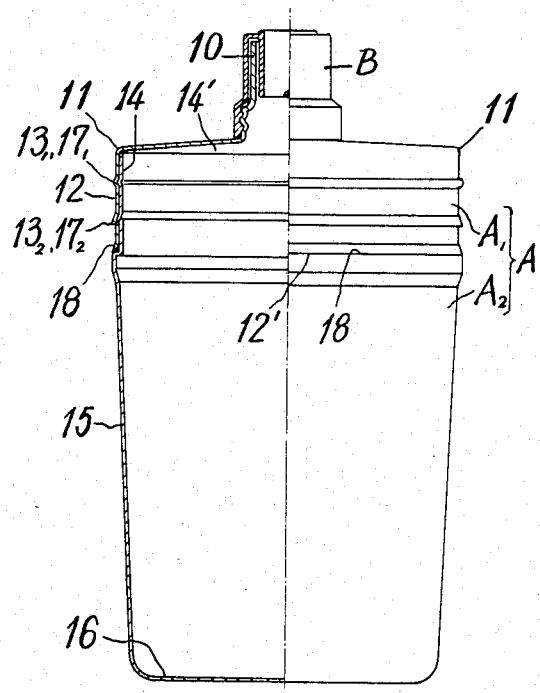
FIG. 8 is a front view, partly cut out, of a culture container for culture of a seed basidiospore bed to be used for the present invention.

The inoculation of the seed basidiospore bed on the host wood according to the present invention will now be described.

As shown in FIGS. 1 to 3, the seed basidiospore bed 2 and 2, respectively inoculated on the host wood M for inoculation propagate in the lengthwise direction (vertical direction) Y of wood at the rate of several scores that of the breadthwise direction X of the wood. In the present invention, a saw cut is made in the host wood M at a suitable depth in the widthwise direction X thereof, so as to provide an inoculation recess 1 having a transverse cutout 1' along the outer periphery of the host wood M. Into this inoculation recess 1, a flat, half-moon shaped seed basidiospore bed 2 is buried in a manner to close the cut end 1' with the arc-shaped periphery 5 of the seed basidiospore bed 2. The basidiospore inoculated on the host wood M via the seed basidiospore bed 2 multiplies, as shown in FIG. 2, in a very broad range in comparison with the conventional method of FIG. 1, thus making good use of its characteristics, to demonstrates ability to propagate in a lengthwise direction Y as previously described. Accordingly, it is possible to reduce the number of pieces of the seed basidiospore 2 to be inoculated to a fraction of that of the conventional method, leading to remarkable curtailment of labor and time of the inoculation work. Also, according to the present invention, spawn of the inoculated basidiospore spreads evenly and rapidly in the host wood M, so that propagation of foreign bacteria is suppressed, and simultaneously, the period from inoculation to mushroom development is shortened. Moreover, during cultivation, the mushrooms are apt to develop simultaneously from the surface of the host wood, so that it is possible to expect acceleration of crop time and increase in yield.

The seed basidiospore bed 2 to be used in the present invention is made by the medium of a wood piece having a thickness nearly equal to that of the cut end 1' of the inoculation recess 1 to be formed as aforementioned and cut out into a half-moon shape to conform to the profile of the inoculation recess and the seed basidiospores are inoculated thereon to make a pure culture. Desirably, the seed basidiospore bed 2 is to be buried in the host wood M so as to fill up the gap in inoculating. Practically, however, the host wood M has various diameters and its sectional size is not fixed. Therefore, it does not necessarily occur for the seed basidiospore bed 2 which is produced on a standard basis to agree with the cut end 1' of the host wood M conforming to the profile of the inoculation recess 1.

Accordingly, the present invention has been designed to provide a notch on the inner periphery of the seed basidiospore bed 2 which is, as a whole, formed in a flat, half-moon shape, by which it is made possible to modify the size of the seed basidiospore bed 2 to conform to the size of the inoculation recess 1.

The seed basidiospore bed 2 whose size is made variable is shown in FIG. 4. In the figure, the part 3 is a notch provided on the seed basidiospore bed 2 from the mid part of its inner periphery 4 (or side to go inside the inoculation recess 1) toward the mid part of the arc periphery 5 (which is formed to fill up the cut end 1' of the inoculation recess 1). This notch 3 may be formed, as shown in FIG. 4(a), in a style of a small width slit, or, as shown in FIG. 4(b), in a style of an isosceles triangle cutout, or, as shown in FIG. 4(c), in a style of an isosceles triangle cutout with an arc at the top, or, as shown in FIG. 4(d), in a style of being cut out to a degree up to the periphery 5 of the arc, so that the seed basidiospore bed 2 to be set into an inoculation recess 1 is substantially constituted into a pair of symmetric pieces $2_1$ and $2_2$. In any of these styles, the individual seed basidiospore bed 2 which has been uniformly produced can be modified for its shape by further opening or closing the notch 3 so as to bring it near to the size and the shape of the individual inoculation recess 1 which differs according to the size of the diameter of the host wood M to which the bed is applied. (Refer to FIG. 3.)

With respect to the shape of the inoculation recess 1 in the present invention, the width and the height of the cut end 1' scarcely make a difference even by the change in the kind of saw to be used, but the shape of the inner profile may vary. For example, when a straight tooth type saw is used, the cut end becomes a straight line form. Against this, when a circular tooth saw is used, the cut end becomes an arc form. Accordingly, the present invention is designed to cover modifications of a seed basidiospore bed 2 having a linear inner periphery 4 as shown in FIG. 4(e), and a seed basidiospore bed 2 having an arc inner periphery 4 opposite to the arc periphery 5 as shown in the same figure (f). These two kinds of seed basidiospore bed 2 can be selectively used according to the kind of the saw to be used so that the seed basidiospore bed 2 can be exactly set into the inner periphery of the inoculation recess 1 without space.

Further, as shown in FIG. 5, the present invention is designed to facilitate insertion of the seed basidiospore bed 2 into the inoculation recess 1 by tapering its thickness toward the inside end 4 so as to become slightly thinner than the thickness of the outer end 5 of the arc.

In this case, if the wall of the seed basidiospore bed 2 is uniformly tapered, the arc periphery 5 which is to block the cutout 1' of the inoculation recess 1 is to leave spaces at its two ends proportionate to the tapering angle. Therefore, in inserting from the front of the inoculation recess 1, it is desirable to form the seed basidiospore bed 2 in a reversed conical inclined surface in a manner to make the mid part of the inner periphery 4 which is received by the cut end 1' the thinnest. At least the product which is formed in a wedge form so that the vertical section at the mid part of the seed basidiospore bed 2 is lowered in the direction of advance into the inoculation recess 1 can attain the object of the present invention. According to the present invention designed as above, in inoculating the basidiospore bed on the host wood M, the thin inner periphery 4 is firstly inserted into the inoculation recess 1, so that the insertion is easily made. Therefore, in inoculating the flat, rather fragile, seed basidiospore bed 2, breakage of the bed 2 is prevented and the work efficiency can be improved.

The present invention is further designed, as shown in FIG. 6, to provide in advance a chemical coating layer 6 or a covering layer for prevention of entry of foreign bacteria or rain water and drying on the arc periphery 5 of the seed basidiospore bed 2 which is to be exposed on the cut end 1' after the inoculation. This can save the after-treatment work which follows the inoculation of the seed basidiospore bed 2. As the arc periphery 5 of the seed basidiospore bed 2 is exposed on the surface of the host wood M blocking the cut end 1' of the inoculation recess 1, foreign bacteria and rainwater are apt to come in from the exposed portion, and also the exposed portion gives off water. Accordingly, it is desirable to apply wax or a waterproof film onto the exposed portion. However, as such an aftertreatment work requires extra time, it often occurs that such treatment is omitted, giving rise to one of the causes for defective cultivations. According to the present invention wherein the portion to be exposed is previously provided with a coating layer 6 or a covering layer as above, the necessary treatment can be done simultaneously with planting of the seed basidiospore bed 2. The coating layer 6 is formed by applying, before culture of the seed basidiospores, an acrylic or urethane or silicone resin alone or with 0.5 to 0.1% of butyl benzoate or thiabendazole or methyl-1-(butylcarbamoyl)-2-benzimidazole carbamate incorporated therein as a mold preventing agent. As a modified embodiment of the present invention, a thin synthetic resin film containing the above component may be applied to make a coating layer.

Further, the present invention is designed, as shown in FIG. 7, to form a number of artificial fissures 9 on the wood piece 2' (to become the medium for the seed basidiospore bed, before culture of the seed spore) in the direction of crossing the grain 8 of said wood piece 2'. This makes it possible to shorten the culture duration of the seed basidiospore bed 2 and realize full ripening more rapidly. Formation of artificial fissures 9 on the wood piece 2' can be made by allowing the grain 8 to pass through the rotating roll on which plural circular saw teeth are coaxially mounted in a manner that the grain 8 crosses the axial line of said roll. When the wood piece 2' provided artificially with the fissures 9 is inoculated with the seed basidiospores and cultivated, the characteristics of the spores of the kind which are apt to propagate in vertical direction can be utilized, by which shortening of the culture duration and an early full ripening can be attained. It is thus possible to offer an excellent seed basidiospore bed 2 which is rich in active deposition property and easy to cultivate.

According to the present invention, the half-moon shaped seed basidiospore bed 2 to be used in the present invention can be readily taken in and out of the culture container, so that the seed basidiospore bed 2 which is apt to be cracked due to its flat shape can be prevented from being damaged. Further, the empty culture containers can be stored without occupying a large space.

Figure 9:
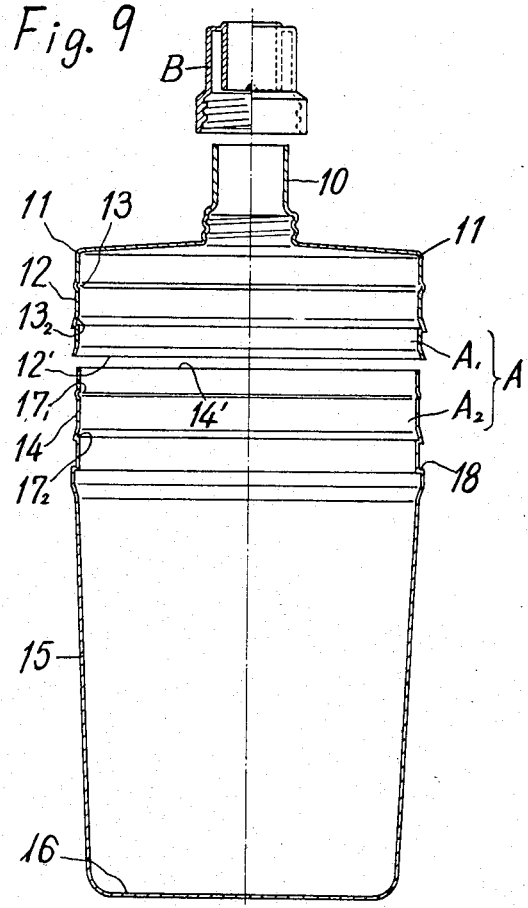
FIG. 9 is a front view, partly cut out, of the culture container according to FIG. 8 being shown in disassembled state.

Referring to the culture container A of the present invention, as shown in FIGS. 8 and 9, a thin walled, hollow synthetic resin culture container body A, having a mouth 10 to accommodate a cap B at its upper end, is divided into the upper and the lower parts at the lower part of the shoulder 11 of the container A, i.e., into the upper section $A_1$ and the lower section $A_2$ which are mutually readily engageable and separable.

The upper section $A_1$ is furnished with a mouth 10, which is screwed at its upper end with a double tube type cap B for plugging with cotton (not shown in the drawing), a shoulder 11 whose circumferential size is enlarged from the lower end of the mouth 10, and a cylindrical coupling part 12 which is continued to the lower section of the shoulder 11 with the same diameter. The coupling part 12 has on its inner circumferential surface the concave sectional circumferential grooves $13_1$, $13_2$ in the two upper and the lower steps. The lower step circumferential groove $13_2$ has a wedge form concave section.

Also, the lower edge 12' of the coupling part is formed into a slightly outwardly open edge. On the other hand, the lower section $A_2$ has an open circular upper periphery 14', and at its top end a coupling part which is to be engaged in tight contact with the inner circumferential surface of the coupling part 12. Downward from the coupling part 14, a barrel 15 and a bottom 16 of the container are formed in one-piece. On the outer circumferential surface of the coupling part 14 there are the circumferential convex sectional ribs $17_1$, $17_2$ having the corresponding shapes respettively to the above circumferential grooves $13_1$ and $13_2$, and, on a part continued to the barrel 15, at the lower edge 12' of the coupling part 12, a stopping flange 18 to restrict the coupling depth is provided.

Into the container body A for cultivating the seed basidiospore bed constituted as above, there are contained the flat, half-moon shaped wood pieces 10' which are to form the materials for the seed basidiospore bed 2 together with the nutrient suitable for cultivating the mushroom spores, and the coupling part 12 is set into the coupling part 14 until the lower edge 12' of the upper section $A_1$ is stopped by the stopper flange 18 of the lower section $A_2$, by which the circumferential grooves $13_1$, $13_2$ are engaged respectively with the circumferential ribs $17_1$, $17_2$, with the result that the lower section $A_2$ is prevented from slipping out even when the bottle is carried with its mouth 10 held. Then, through the mouth 1 mushroom spores are inoculated on the above wood piece 2', a cotton-plugged cap B set in, and cultivation is made in the culture chamber for a prescribed period of time. The seed basidiospore bed 2 which has completed culture of the seed spores, in container body A, is carried to the place of cultivation where the host wood M for inoculation is available, taken out by removing the upper section $A_1$, and inoculated according to the procedures as aforedescribed.

The culture container of the present invention constituted as above and made usable as described, can be used to store the material wood piece 2' and to take out the seed basidiospore bed 2 in planting, by largely opening the container. Therefore, it is suitable for containing the flat, flagile seed basidiospore beds and is effective for preventing the beds from being damaged. The container can be safely carried. In keeping the empty containers in stock, the upper and the lower container sections $A_1$ and $A_2$ can be laid in combination respectively to reduce their total volume.

The transverse inoculation recess 1 to be formed on the host wood M for inoculation to be used in the present invention is, according to the present invention, scarcely affected by the size or the bend of the raw wood, and can be mechanically bored almost uniformly and with high efficiency.

Now, the boring apparatus for the host wood for inoculation of the present invention with reference to FIGS. 10, 11, and 12 will be described.

Figure 10:
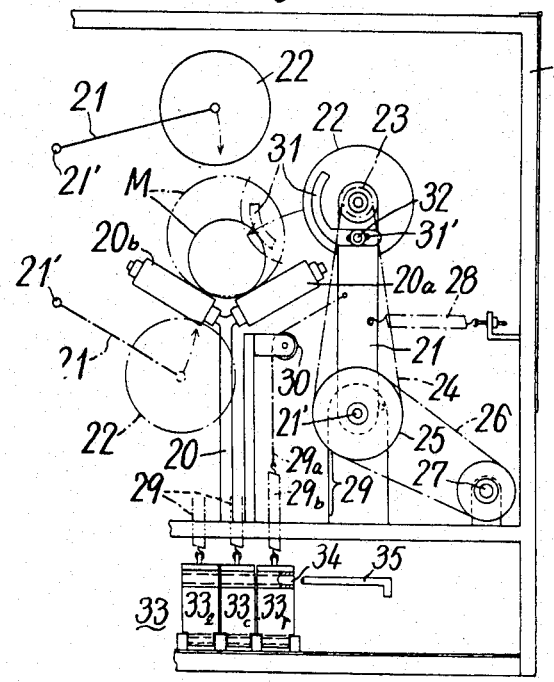
FIG. 10 is a front view, partly cut out, of a boring apparatus of the host wood for inoculation to be used for the present invention, shown in abbreviation.

In FIG. 10, the boring apparatus includes a sterically constructed frame F and a bearing stand 20. The bearing stand 20 comprises three Y-shaped stays 20a erected at a certain interval along the center line of the frame F and the rollers 20b which are accommodated respectively to the upper right and left parts of the stays 20a. By means of three pairs of rollers 20b which are inclined in V-shape, the host wood for inoculation M is supported at its front and rear parts and middle part. Plural arms 21, each being supported by the fulcrum shaft 21' provided on the frame F, are freely swingably provided on the transverse direction of the host wood M. Circular saw teeth 22 for cutting the host wood M transversely are fixed to the tip of each arm 21 in freely rotatable manner. Each tooth 22 is linked via the pulley 23, driving belt 24, pulley 25 provided on the fulcrum 21' of the arm, and the motor rotation shaft 27 for driving the pulley 25 via the driving belt 26 transversely laid on the frame F. Each sawtooth rotates following the motor (not illustrated) which drives the motor rotation shaft 27. Coil springs 28 are provided between the frame F and the respective arms 21. A tracting device 29 exerts a swing motion to each arm 21 resisting the coil spring 28 so as to bring the saw tooth 22 close to the host wood M. This tracting device 29 comprises a wire 29a whose one end is fixed to the arm 21 with its middle part supported by the roller 30, and a coil spring type elastic member 29b connected with the other end of the wire 29a. A cutting limiter 31 restricts the depth of cutting of the saw tooth in contact with the surface of the host wood M in cutting with the saw tooth 22. Each cutting limiter 31 has a slot 31' at its base of fitting to the arm, so that, by sliding this slot 31' along the stopping screw 32, the distance between the limiter 31 and the crest of the saw tooth 22 is changed to adjust the cutting depth of the saw tooth 22.

Figures 11, 12:
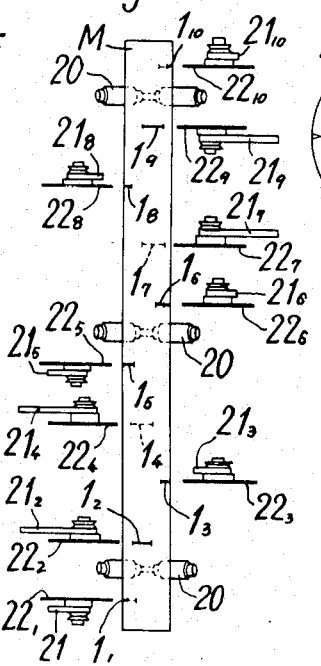
FIG. 11 is a plan view to illustrate the condition of use of the apparatus of FIG. 10; and, FIG. 12 is a front view to illustrate the condition of formation of the slot for inoculation on the host wood using the above boring apparatus.

In the embodiment as shown in FIG. 11, the arms 21 are arranged in a manner to surround the bearing stand 20 from all sterical directions 10 in total, each being furnished with a coil spring, a sawtooth, a tracting device, and a cutting limiter. As illustrated in FIG. 10, the lower end of the tracting device 29 (coil spring type elastic member 29b) is fixed to either of the three unit pedals with its lower end projected to the front lower part of the frame F. On treading the pedal 33 shown on the right side of FIG. 10, the arms $21_3$, $21_6$, and $21_{10}$ positioned on the right side in FIG. 11 are tracted. When the central pedal $33_c$ is treaded, likewise the other arms $21_7$ and $21_9$ on the right side and the arms $21_2$ and $21_4$ on the left side are tracted, while on the other hand, when the left side pedal $33_1$ is treaded, likewise the other left side arms $21_1$, $21_5$, and $21_8$ are tracted. Each arm 21 is connected respectively with a single pedal 33, being divided into three directions of right side, up-down side, and left side, according to the direction of access to the host wood M. Also, each pedal $33_{r, c,}$ and $_l$ is provided on the reverse surface at the foremost end as shown in FIG. 10, with a through hole 34 on the mutually common position, and, by thrusting a single rod 35 therethrough which is freely detachably engaged therewith, the abovementioned 10 arms 21 are simultaneously tracted.

The above 10 arms $21_{1-10}$ have, as shown in FIG. 10, their fulcrum positions and lengths suitably, and, as shown in FIG. 11, they are suitably arranged at nearly an equal distance along the lengthwise direction of the host wood M. The saw teeth $22_{1-10}$ at the tip of each arm $21_{1-10}$ are, as shown in FIG. 12, so provided as to make it possible to cut at nearly an equal angle to each other into the circumference of the host wood M. Also, the saw teeth $22_{1-10}$ are so provided that the cutting position of the inoculation recesses $1_{1-10}$ to be formed in a transverse direction of the surface of the host wood are to be arranged on nearly two round spiral lines.

In FIG. 11, the portion shown in real line of the inoculation recesses $1_{1-10}$ is that visible from above. The portion shown in the broken line represents the portion to be formed on the reverse side. The short lines at both ends are to show approximate length of the recess.

The aforementioned motor rotation shafts 27 for driving the saw teeth 22 are two parallel horizontal units along both sides of the bearing stand 20, having mutually a relation of conveying motive power. One shaft is connected with an output shaft of a motor or an engine.

In using the present boring apparatus constituted as above, the tracting device 29 is activated to bring the arm 21 close to the host wood M supported by the bearing stand 20. Then the sawtooth 22 driven by the motor rotation shaft 27 provides cutting into the host wood M in a transverse direction. The cutting in depth is determined in such manner that the cutting limiter 31, together with the sawtooth 22, having an access to and in contact with the surface of the host wood M, fixes the angle of the arm 21. The traction force which works beyond it is absorbed by an elongation of the elastic member 29b which is attached to the tracting device 29. Accordingly, both in the case of individually tracting the arm 21 and in the case of simultaneously tracting the arm 21 to form the inoculation recesses $1_{1-10}$, the cutting depth, i.e., the depth of the inoculation recess, can be formed at nearly constant rate. Also, even in case of some differences in the diameters or existence or not of bend of the host wood M for inoculation, the inoculation recesses are formed at the prescribed positions with nearly a fixed depth.

As described above, according to the present invention, even in case of the differences in coarseness or inclusion or not of the bend of the host wood for inoculation, the inoculation recess 1 to be provided can be mechanically formed with suitable depth, respectively. Also, according to the present invention, it is possible to keep a piece of host wood for inoculation placed at a fixed position, to which various inoculation recesses 1 can be provided at a certain interval with one another and from diversified directions. Moreover, according to the present invention, plural inoculation recesses 1 can be provided simultaneously in a same direction on a single host wood M by means of a single pedal operation.

Further, according to the present invention, it is possible to form at one time the prescribed number of inoculation recesses 1 on the surface of a piece of host wood M for inoculation at a certain distance and with spiral arrangement around the host wood. Furthermore, according to the present invention, by changing the setting position of the cutting limiter 31, the depth of the inoculation recess 1 can be adjusted according to the size of the host wood M for inoculation.

What is claimed is:

1. A method for inoculating basidiospores of mushroom (*Lentinus edodes*) which comprises:
   (a) forming a transverse recess on the outer periphery of a host wood for inoculating mushroom basidiospores therein at a suitable depth and
   (b) inserting therein a flat, half-moon shaped seed basidiospore bed to fill said recess for inoculation.

2. The method according to claim 1 wherein a seal coating to prevent bacterial contamination and drying of the bed is applied to the bed before or after insertion of said bed into said transverse recess.

3. A seed basidiospore bed for insertion into a transverse recess cut out of a host wood which comprises a medium comprising a flat, half-moon shaped arc sided piece of wood having a flat side and an arc side opposite said flat side and having nearly the same shape as and equal thickness to the said recess, said medium having inoculated therein a substantially pure culture of seed basidiospores.

4. The seed basidiospore bed according to claim 3, wherein said seed basidiospore bed includes a notch of an appropriate depth from the mid part of its flat side which is opposite the mid part of its arc side.

5. The seed basidiospore bed according to claim 4, wherein said notch has the shape of an isosceles triangle having an appropriate bottom side length.

6. The seed basidiospore bed according to claim 5, wherein said notch has an arc at the top of the isosceles triangle.

7. The seed basidiospore bed according to claim 4, wherein said notch reaches the middle part of said arc periphery, whereby the seed basidiospore bed to be set into the recess for inoculation substantially comprises a unit of a pair of right and left side pieces.

8. The seed basidiospore bed according to claim 3, wherein said flat side of the seed basidiospore bed opposite the arc side is formed in a straight line, said bed being as a whole formed in a flat comb-like shape in plan view.

9. The seed basidiospore bed according to claim 3, wherein the middle part of said flat side has an outwardly curved form opposite said arc side.

10. The seed basidiospore bed according to claim 3, wherein said arc side has a thickness nearly equal to the cutout of said recess for inoculation, and said flat side has a thickness thinner than that of said arc side, and at least the vertical sectional surface passing through the mid part of the two sides is inclined in a wedge shape so as to become lower along the direction of entry into said recess for inoculation.

11. The seed basidiospore bed according to claim 3, wherein the arc side of said seed basidiospore bed which is to fill the recess for inoculation by application to the host wood for inoculation is previously provided with a coated layer or a covered layer for preventing foreign bacteria or rainwater from entering after the inoculation, and preventing the seed basidiospore bed from being dried.

12. The seed basidiospore bed according to claim 3, wherein said bed has on its flat surface a number of artificial fissures provided in the direction intersecting the grains of the medium wood piece.

13. A container for culturing a seed basidiospore bed comprised of pieces of wood having a half-moon shape to be inoculated with mushroom basidiospores for the culturing thereof, which comprises a thin-walled hollow cylindrical container body having a mouth for accommodating a cap at the top, said container body being separable into upper and lower sections having coupling parts, the upper section including the mouth and a shoulder part, said upper section having a cylindrical form with its diameter equal to that of the container body and its circular lower end opened, including on the outer periphery of the cylindrical coupling part a convex sectional circumferential groove, and said lower section having a cylindrical form with its circular upper end opened, including on the outer periphery of the cylindrical coupling part a convex sectional circumferential rib to engage with said circumferential groove, a barrel and a bottom of the container body being formed in one-piece continued to the underside of said coupling part, said circumferential grooves and circumferential ribs are formed in more than two steps on the upper and the lower parts respectively on said coupling parts and, one step each thereof is formed in convex and concave wave forms in section respectively so as to act as a stopgap between the coupling parts, there being a stopping flange on the lower section which restricts the mutual coupling depth in contact with the lower edge of the coupling part of said upper section on the part having the continuation of the coupling part and the barrel part of said lower section, and the lower edge of said coupling part in contact with said stopping flange is formed into an open edge which is slightly widely inclined outward.

* * * * *